United States Patent [19]

Hernandez

[11] 4,106,811

[45] Aug. 15, 1978

[54] FISHING SEAT, ROD, AND PAIL HOLDER

[76] Inventor: Henry Hernandez, 1087 Admont Ave., Franklin Sq., N.Y. 11010

[21] Appl. No.: 757,906

[22] Filed: Jan. 10, 1977

[51] Int. Cl.² .............................................. A01K 97/10
[52] U.S. Cl. .................... 297/193; 43/21.2; 43/54.5 R; 248/538; 297/188
[58] Field of Search .............. 43/21.2, 54.5 R, 54.5 A, 43/56, 57.5 R, 57.5 A; 248/538, 534; 297/193, 188

[56] References Cited

U.S. PATENT DOCUMENTS

| 963,285 | 7/1910 | Fly | 43/54.5 R |
|---|---|---|---|
| 981,631 | 1/1911 | Fraser | 297/188 X |
| 2,264,744 | 12/1941 | Dunnam | 43/21.2 X |
| 2,466,801 | 4/1949 | Fong | 248/538 |
| 2,909,215 | 10/1959 | Mitchell | 297/188 X |
| 3,077,327 | 2/1963 | Batie et al. | 297/188 X |
| 3,095,663 | 7/1963 | Miller | 43/21.2 |
| 3,389,489 | 6/1968 | Burns | 43/21.2 X |
| 3,603,019 | 9/1971 | Smeltzer | 43/54.5 R X |
| 3,659,369 | 5/1972 | Hermanson | 43/54.5 R X |
| 3,751,845 | 8/1973 | Van Leeuwen | 297/193 UX |

Primary Examiner—Clifford D. Crowder

[57] ABSTRACT

A collapsible apparatus for a fisherman including a plurality of support members to accommodate a fishing rod which is adjustably attached to a seat. The seat is adjustably attached to a container sufficiently high from the ground to permit the fisherman to sit in the seat comfortably while fishing. This container can be partially filled with water so that the fish caught can be placed therein and so that they remain fresh.

1 Claim, 2 Drawing Figures

FISHING SEAT, ROD, AND PAIL HOLDER

PRIOR ART

The following patents are considered pertinent: U.S. Pat. Nos. 3,667,708, 3,385,544, 3,659,369, 3,095,663, 3,074,197, 3,543,432, 3,017,149, 3,571,964.

BACKGROUND OF THE INVENTION

This invention relates to an improved combination of a holding device for fishing rods, a fisherman's seat and a container for caught fish.

A common problem associated with the sport of fishing is that the fisherman can become very tired from constant standing and from constantly holding a fishing rod in the proper attitude in preparation for hauling a caught fish. Presently available devices for solving these problems have proven either too expensive or too cumbersome to use or carry to the fishing spot desired.

It is an object of the invention to provide a fishing rod holding device which is simply constructed, is portable and can be constructed inexpensively.

It is a further object of the invention to provide a fishing rod holding device which also serves as a seat for the fisherman and as a container for caught fish.

SUMMARY OF THE INVENTION

In accordance with this invention, a plurality of vertically positioned arms, each provided with a rod retaining means, are attached to a flat seat structure in a manner so that the arms can be quickly and easily disassembled from the seat. The seat is provided with two slots, each adapted to permit an "L"-shaped elbow to extend through the thickness of the seat structure and to engage the outside surface of a container positioned below the seat structure. The elbows are positioned to fit tightly into holes in the container surface to secure the seat to the container but in a manner which permits their being easily disassembled. The container can be partially filled with water and provide a convenient means to store caught fish.

DETAILED DESCRIPTION OF THE PREFERRED EMBODIMENTS

Figure 1:
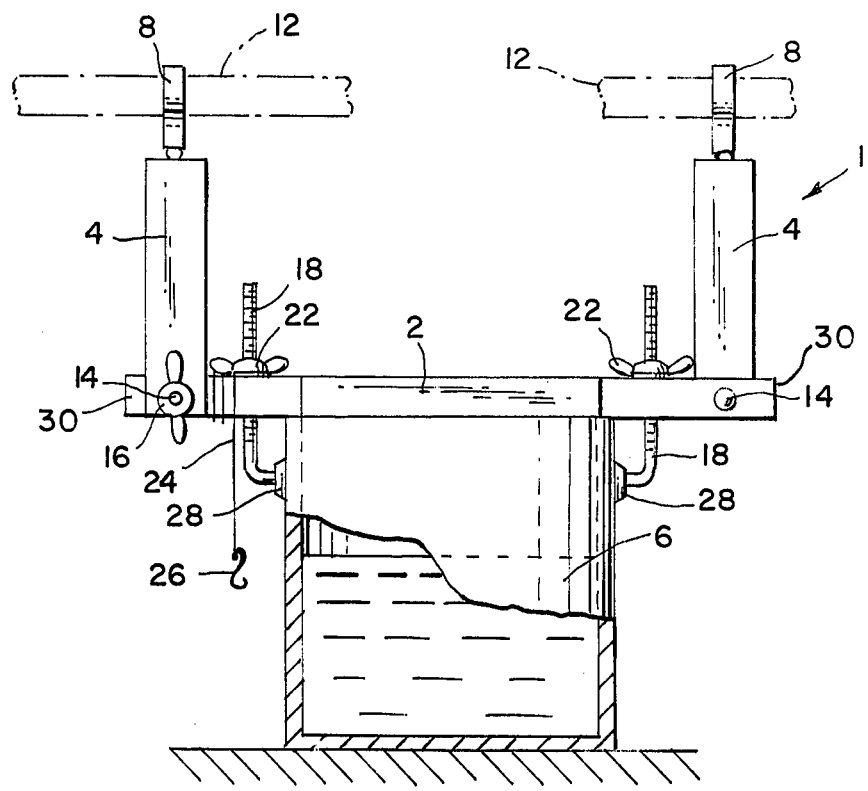
FIG. 1 is a side view, in partial cross-section of the assembled apparatus of the invention.
Figure 2:
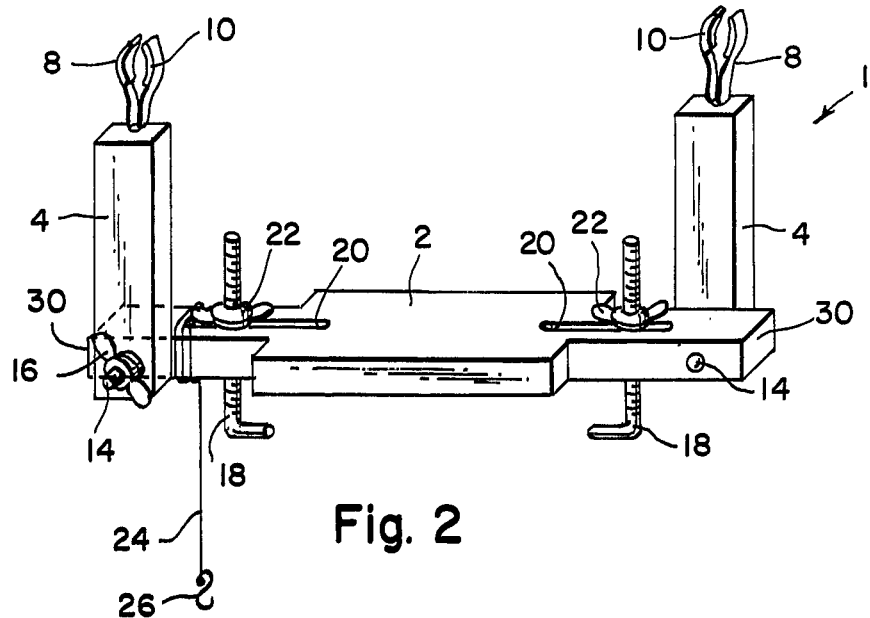
FIG. 2 is a top perspective view of the seat and rod holding means of this invention.

Referring to the figures, the apparatus 1 of this invention comprises a seat 2, a plurality of vertically positioned arms 4 and a container 6. To the tops of arms 4 are pivotally mounted spring clamps 8 which may have adhered to their inner surfaces a resilient material 10 such as cork which serve to protect the surfaces of the fishing rods 12. The arms 4 are tightly secured to seat 2 by means of bolts 14 which extend through the thickness of seat 2 and wing nuts 16. The seat 2 is secured to container 6 by means of "L" shaped elbows 18 which extend through slots 20 and wing nuts 22 which also can include a washer positioned between the wing nuts 22 and the seat 2. One end of the elbow 18 fits into the slot or holes 28 on the outside surface of the container 6. Optionally, the apparatus can be provided with a cord 24 and clip 26 combination secured to the seat 2, each associated with a rod holder so that the clip 26 fits around the rod 12 and prevents the rod from being removed from the clamp 8 while fishing. The container 6 can be weighted such as by being partially filled with water to lower the center of gravity of the apparatus thereby improving its stability. If desired, additional arms 4 can be included on the seat 2 by providing longer seat extensions 30 to accommodate the increased number of arms 4 and spring clamps 8.

As is obvious from the above descripiton, the apparatus is easily assembled and disassembled merely by loosening the wing nuts 16 and 22 so that the arms 4 can be folded and the elbows 18 can be disengaged from the container 6.

It is to be understood that this invention is not limited to the features specifically described and that obvious modifications thereof can be made without departing from the scope of the invention.

What is claimed is:

1. A combined fishing seat and rod and pail holder comprising:
   a horizontal seat,
   a plurality of vertically extending arms removably secured to said seat,
   spring clamps attached to the upper ends of said arms for holding a rod and having their rod engaging surfaces coated with a resilient material,
   a pair of slots extending through said seat,
   a pail positioned under said seat and having a pair of holes in the side thereof,
   an L-shaped member extending through each of said slots in said seat and into each of said holes in said pail,
   means to secure each said L-shaped member to said seat and pail, and
   a clip attachable to said rod and fastened to said seat by a cord.

* * * * *